(12) United States Patent
Harriman et al.

(10) Patent No.: US 11,070,527 B2
(45) Date of Patent: Jul. 20, 2021

(54) SECURING PLATFORM LINK WITH ENCRYPTION

(71) Applicant: Intel Corporation, Santa Clara, CA (US)

(72) Inventors: David J. Harriman, Portland, OR (US); Raghunandan Makaram, Northborough, MA (US); Ioannis T. Schoinas, Portland, OR (US); Kapil Sood, Portland, OR (US); Yu-Yuan Chen, Chandler, AZ (US); Vedvyas Shanbhogue, Austin, TX (US); Siddhartha Chhabra, Portland, OR (US); Reshma Lal, Portland, OR (US); Reouven Elbaz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 16/372,353

(22) Filed: Apr. 1, 2019

(65) Prior Publication Data
US 2019/0281025 A1    Sep. 12, 2019

Related U.S. Application Data

(60) Provisional application No. 62/776,781, filed on Dec. 7, 2018.

(51) Int. Cl.
*H04L 29/06* (2006.01)
*H04L 9/08* (2006.01)
(Continued)

(52) U.S. Cl.
CPC ...... *H04L 63/0428* (2013.01); *G06F 13/4282* (2013.01); *H04L 9/0631* (2013.01);
(Continued)

(58) Field of Classification Search
CPC . H04L 63/0428; H04L 9/0631; H04L 9/0637; H04L 9/0894; G06F 13/4282; G06F 2213/0026
(Continued)

(56) References Cited

U.S. PATENT DOCUMENTS

2010/0251055 A1    9/2010  Murakami et al.
2012/0166582 A1*   6/2012  Binder ................. G06F 21/602
                                                              709/217
(Continued)

OTHER PUBLICATIONS

M. Shahidul Islam; A common-path optical coherence tomography based electrode for structural imaging of nerves and recording of action potentials; spiedigitallibrary; 2013; p. 1-8.*
(Continued)

*Primary Examiner* — Monjur Rahim
(74) *Attorney, Agent, or Firm* — Alliance IP, LLC

(57) ABSTRACT

A protected link between a first computing device and a second computing device is set up, wherein communication over the protected link is to comply with a communication protocol that allows packets to be reordered during transit. A plurality of packets are generated according to a packet format that ensures the plurality of packets will not be reordered during transmission over the protected link, the plurality of packets comprising a first packet and a second packet. Data of the plurality of packets are encrypted for transmission over the protected link, wherein data of the first packet is encrypted based on the cryptographic key and a first value of a counter and data of the second packet is encrypted based on the cryptographic key and a second value of the counter.

21 Claims, 14 Drawing Sheets

(51) Int. Cl.
*H04L 9/06* (2006.01)
*G06F 13/42* (2006.01)

(52) U.S. Cl.
CPC .......... *H04L 9/0637* (2013.01); *H04L 9/0894* (2013.01); *G06F 2213/0026* (2013.01)

(58) Field of Classification Search
USPC .......................................................... 713/160
See application file for complete search history.

(56) References Cited

U.S. PATENT DOCUMENTS

| | | | | |
|---|---|---|---|---|
| 2013/0089099 | A1* | 4/2013 | Pollock | H04L 49/00 370/394 |
| 2014/0304450 | A1* | 10/2014 | Maeda | H04L 49/70 710/316 |
| 2015/0319231 | A1* | 11/2015 | Naouri | H04L 49/70 709/204 |
| 2016/0149696 | A1 | 5/2016 | Winslow et al. | |
| 2018/0183581 | A1 | 6/2018 | Elbaz et al. | |
| 2019/0050365 | A1 | 2/2019 | Kopzon et al. | |
| 2019/0052617 | A1 | 2/2019 | Chen et al. | |
| 2019/0058675 | A1* | 2/2019 | Schubert | H04L 47/30 |
| 2019/0220601 | A1 | 7/2019 | Sood et al. | |
| 2019/0220617 | A1 | 7/2019 | Harriman et al. | |
| 2019/0243796 | A1* | 8/2019 | Ping | G06F 13/1668 |
| 2019/0306134 | A1 | 10/2019 | Shanbhogue et al. | |

OTHER PUBLICATIONS

EPO; Extended European Search Report issued in EP Patent Application No. 20154933.4, dated Jul. 31, 2020; 9 pages.

IEEE Computer Society, "IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications" IEEE Standards Association, IEEE Std 802.11, (Dec. 7, 2016).

IEEE-SA Standards Board, "IEEE Standard for Local and Metropolitan Area Networks: Media Access Control (MAC) Security," Jun. 8, 2006 (154 pages).

Intel Corporation, "PHY Interface for the PCI Express, SATA, USB 3.1, DisplayPort, and Converged IO Architectures, Version 5.2," Pub Date 2007-2019 (166 pages).

PCI Express, "PCI Express, Base Specification, Revision 4.0, Version 1.0," Sep. 27, 2017 (1293 pages).

Trusted Computing Group Incorporated, "TCG Storage Security Subsystem Class: Opal, Specification Version 2.01, Revision 1.00," Aug. 5, 2015 (80 pages).

* cited by examiner

| Row Pass Column? | | Posted Request (Col 2) | Non-Posted Request | | Completion (Col 5) |
|---|---|---|---|---|---|
| | | | Read Request (Col 3) | NPR with Data (Col 4) | |
| Posted Request (Row A) | | a) No<br>b) Y/N | Yes | Yes | a) Y/N<br>b) Yes |
| Non-Posted Request | Read Request (Row B) | a) No<br>b) Y/N | Y/N | Y/N | Y/N |
| | NPR with Data (Row C) | a) No<br>b) Y/N | Y/N | Y/N | Y/N |
| Completion (Row D) | | a) No<br>b) Y/N | Yes | Yes | a) Y/N<br>b) No |

*FIG. 8A*

| Row Pass Column? | | Posted Request (Col 2) | Non-Posted Request | | Completion (Col 5) |
|---|---|---|---|---|---|
| | | | Read Request (Col 3) | NPR with Data (Col 4) | |
| Posted Request (Row A) | | No | Yes | Yes | No |
| Non-Posted Request | Read Request (Row B) | No | No | No | No |
| | NPR with Data (Row C) | No | No | No | No |
| Completion (Row D) | | No | Yes | Yes | No |

*FIG. 8B*

SECURING PLATFORM LINK WITH ENCRYPTION

RELATED APPLICATIONS

This application claims the benefit of priority to U.S. Provisional Patent Application Ser. No. 62/776,781, filed Dec. 7, 2018 and titled "SECURING PLATFORM LINK WITH ENCRYPTION". The disclosure of the prior application is herein incorporated by reference in its entirety.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

A processor may include or be coupled to logic that may couple two devices together via a link. For example, a processor may include an interconnect fabric architecture, such as a Peripheral Component Interconnect (PCI) Express (PCIe) architecture. A primary goal of PCIe is to enable various components and devices (e.g., from different vendors) to inter-operate in an open architecture, spanning multiple market segments.

BRIEF DESCRIPTION OF THE DRAWINGS

FIG. 8A illustrates a default communication ordering scheme in accordance with certain embodiments.

FIG. 8B illustrates a modified communication ordering scheme enabling encrypted link communication in accordance with certain embodiments.

DETAILED DESCRIPTION

Figure 1:
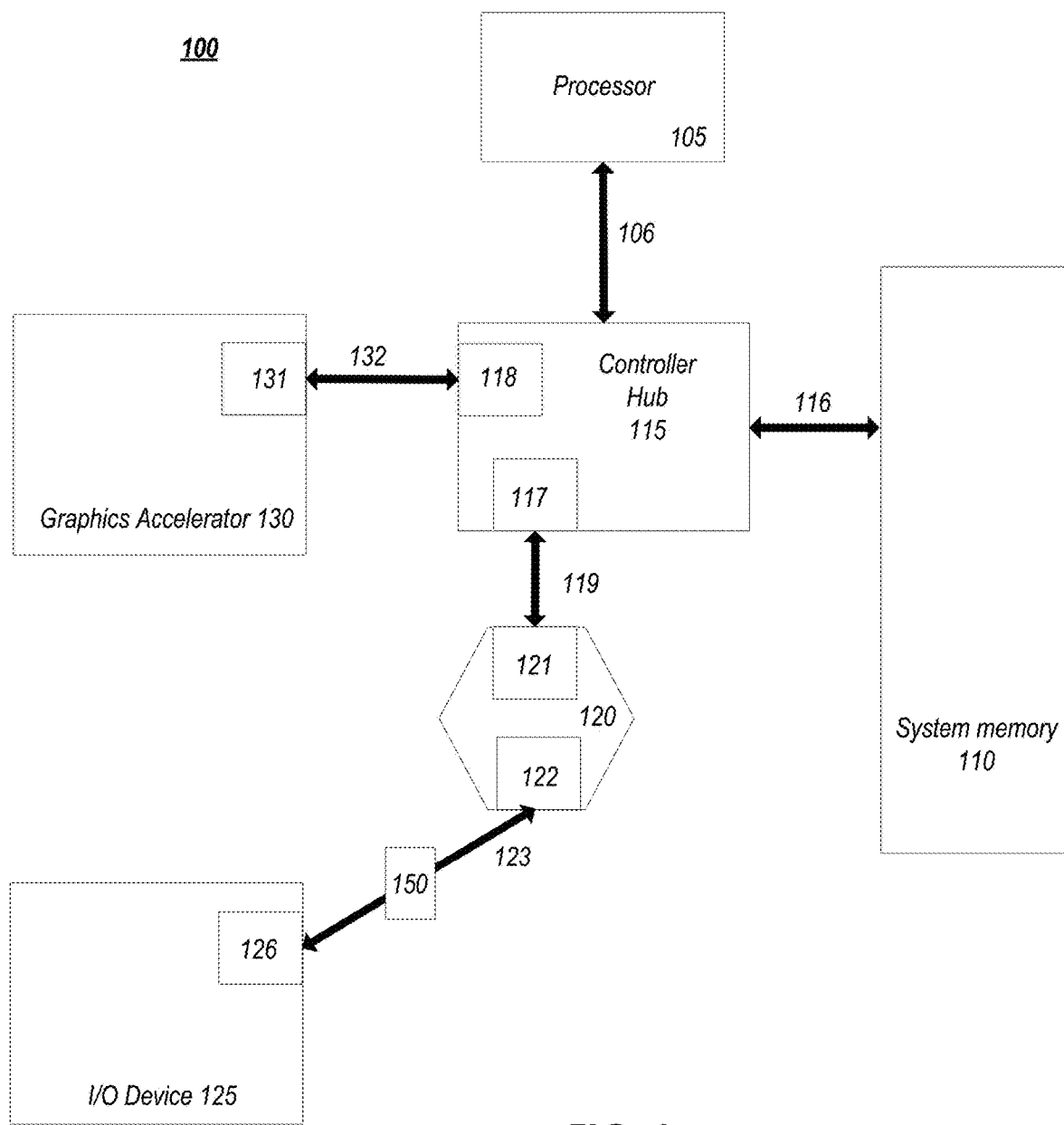
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice all embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the embodiments disclosed herein.

Although the following embodiments may be described with reference to computer security enhancements in specific computing systems, such as in computing platforms, storage devices, or microprocessors, other embodiments are applicable to other types of integrated circuits and logic devices. Similar techniques and teachings of embodiments described herein may be applied to other types of circuits or semiconductor devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from various embodiments described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through a link 106 (e.g., a front-side bus (FSB)). In one embodiment, link 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), volatile memory, non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through controller hub 115 (e.g., root complex) 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, e.g., up a hierarchy towards a root complex, to controller hub 115 and downstream, e.g., down a hierarchy away from a root controller, from processor 105, or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, an accelerator, and other input/output devices. Often in the PCIe vernacular, such a device is referred to as an endpoint. Although not specifically shown, device 125 may include a PCIe to PCI/PCI-X bridge to support legacy or other version of PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
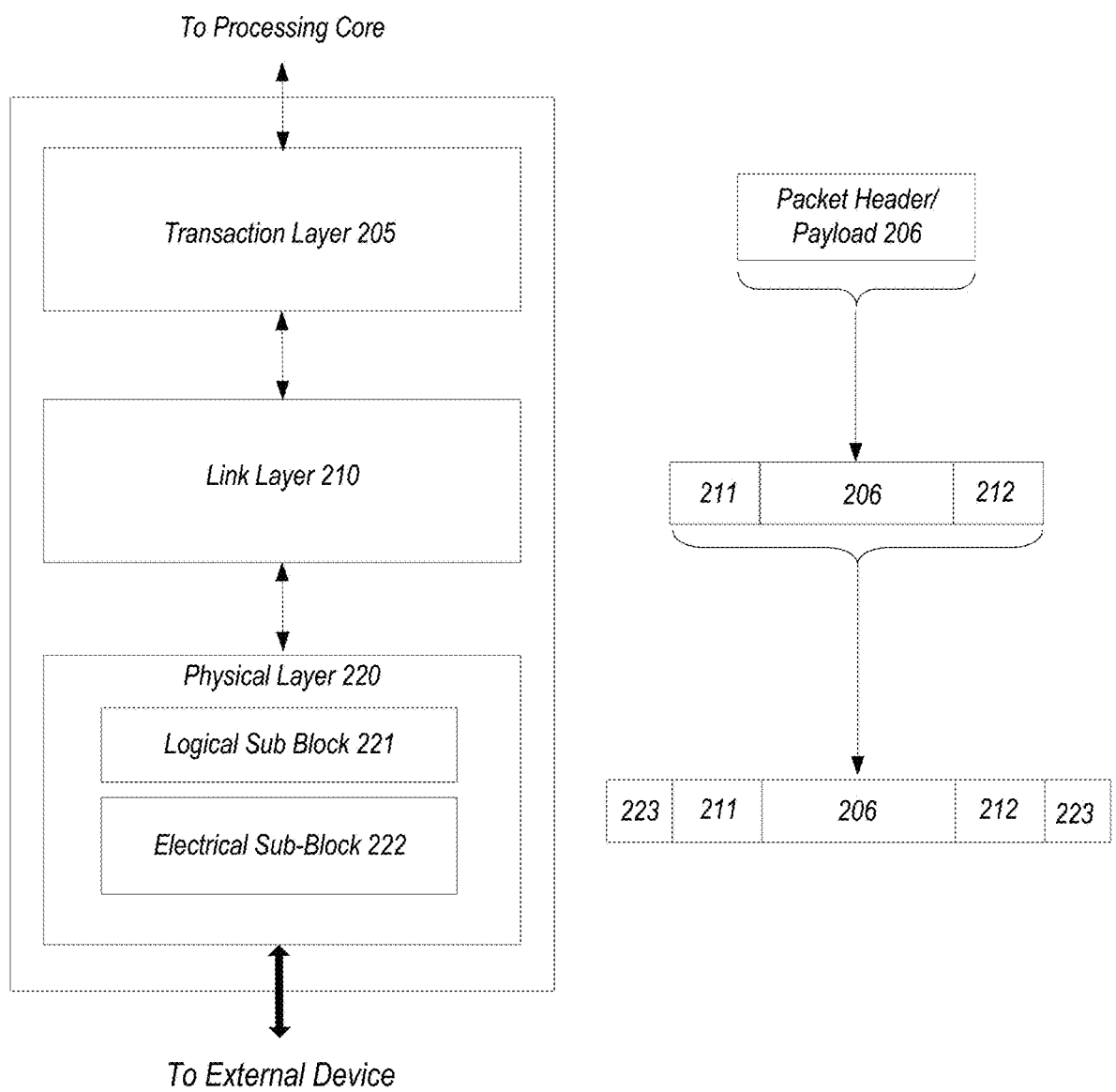
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-based flow control for TLPs. PCIe implements split transactions, i.e., transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as a 64-bit address. Configuration space transactions are used to access configuration space of the PCIe devices. Transactions to the configuration space include read requests and write requests. Message space transactions (or, simply messages) are defined to support in-band communication between PCIe agents.

In one embodiment, transaction layer 205 assembles packet header/payload 206. Format for current packet headers/payloads may be found in the PCIe specification at the PCIe specification website (indeed any reference herein to a portion of the PCIe specification may contemplate any past, current, or future PCIe specification currently available or available in the future at the PCIe specification website or through other means).

Figure 3:
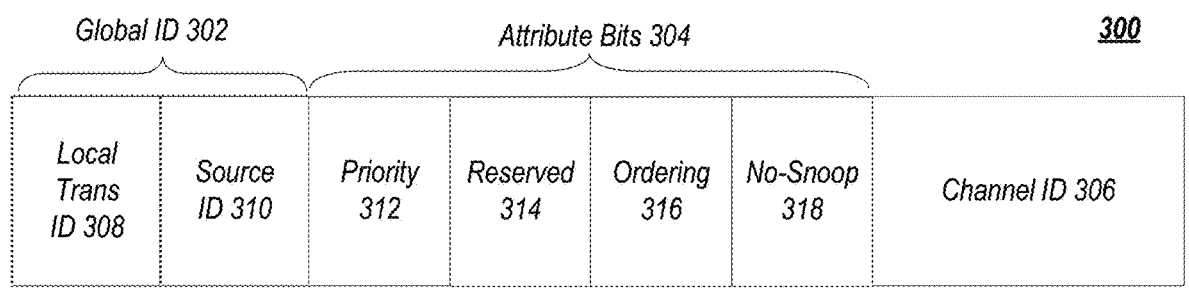
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components over a link. One side of the Data Link Layer 210 accepts TLPs assembled by the Transaction Layer 205, applies packet sequence identifier 211, i.e. an identification number or packet number, calculates and applies an error detection code, e.g., CRC 212, and submits the modified TLPs to the Physical Layer 220 for transmission across a physical medium to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 4:
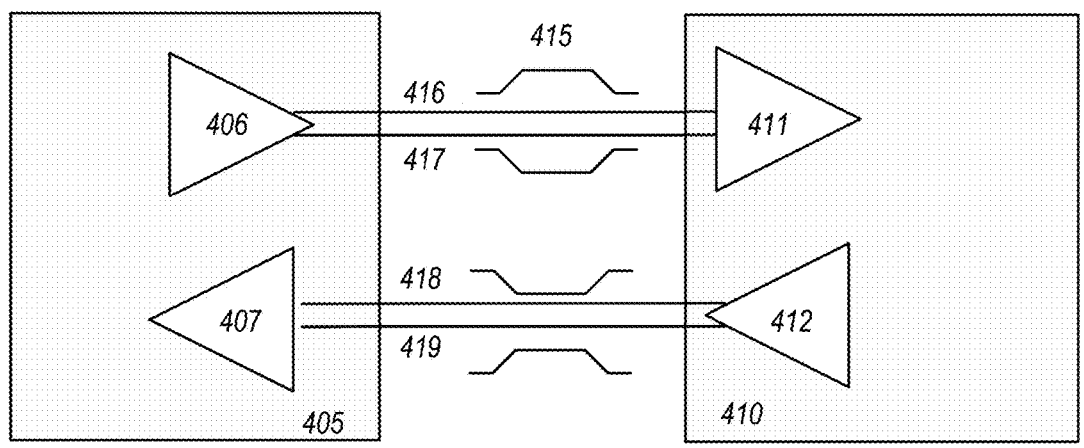
FIG. 4 illustrates an embodiment of a transmitter and receiver pair for an interconnect architecture.

Referring next to FIG. 4, an embodiment of a PCIe serial point-to-point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, e.g., paths 416 and 417, and two receiving paths, e.g., paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Current SoCs have various in-package and off-package links that carry sensitive data. These links are vulnerable against physical attacks in which an attacker directly taps into the physical link to either passively listen to the communication channel or actively intercepts the traffic to implement man-in-the-middle (MITM) attacks. While the risk of physical attacks on in-package and off-package links has generally been low, the security threat landscape is changing due to the presence of sophisticated adversaries, ease of physical attacks, low cost to launch a physical attack, and the increased use of accelerators (e.g., SmartNICs, artificial intelligence, or graphics processing units, etc.) connected via off-package links. Additionally, the growing use of retimer and redriver devices provides a specific MITM attack opportunity. Moreover, industry support of PCIe hardware development has led to the broad availability of hardware tools such as PCIe interposers that also make physical attacks easier. If the supply chain for such devices is infiltrated, device manufacturers may unwittingly incorporate "spy" devices that could, for example, snoop link traffic and then expose the traffic to the outside, e.g., over a radio connection.

In various embodiments of the present disclosure, cryptographic mechanisms are used to protect the traffic flowing through PCIe links against confidentiality, integrity, and replay attacks. While certain characteristics of the PCIe protocol, such as the PCIe ordering rules, make it particularly challenging with respect to employing standard cryptographic protocols, various embodiments overcome these obstacles and provide solutions to employ protections against physical attacks on a link between devices.

In one embodiment, in order to protect the traffic flowing through PCIe links against confidentiality and integrity attacks, an authenticated encryption scheme based on Advanced Encryption Standard operating in Galois/Counter Mode (AES-GCM) with 256-bit keys to encrypt/decrypt data on the link is used. In other embodiments, endpoints (e.g., PCIe Endpoints or other computing devices) may support additional key sizes (for example AES-128) or other suitable crypto-algorithms (e.g., stream ciphers suitable for encrypting communication channels including block ciphers operating in counter mode). Although various embodiments herein are discussed with reference to AES-GCM, such embodiments may be implemented using any suitable crypto-algorithms. In such cases, the endpoints may provide flexible and agile cryptography mechanisms including the ability to enumerate the cryptographic capabilities of the endpoints and may provide authenticated mechanisms to determine the status of the cryptographic algorithm selected.

AES-GCM is an accepted industry standard cryptographic algorithm for protecting the integrity and confidentiality of communication between two agents connected through a communication fabric. AES-GCM (or other crypto-algorithms) relies on initialization vectors (sometimes referred to as nonces) for each transmission. Initialization vectors are an input to the cryptographic algorithm that doesn't have to be secret but must not be repeated for traffic encrypted with the same key. Initialization vectors may be generated by the sender and transmitted with a packet or may be generated in an agreed upon sequence by the sender and the receiver. Herein, initialization vectors may also be referred to as counter values.

Figure 16:
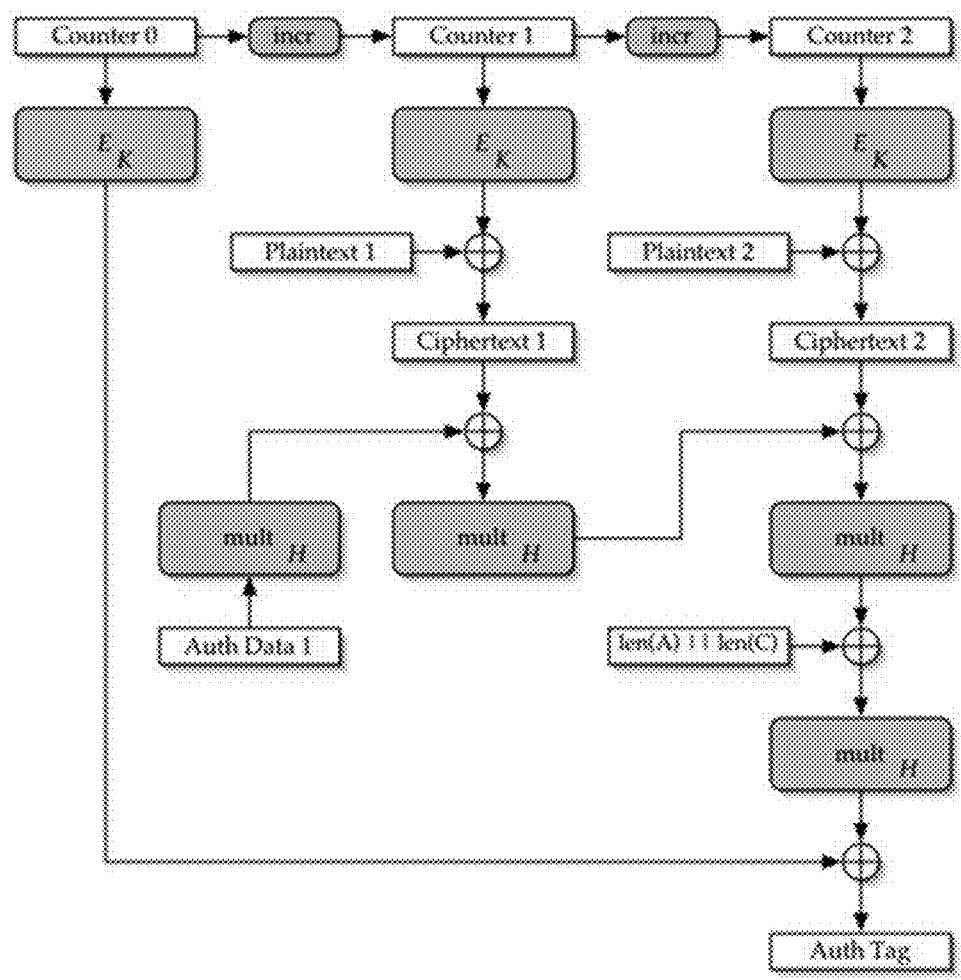
FIG. 16 illustrates an example flow in AES-GCM for using initialization vectors to generate encrypted ciphertext and an auth tag in accordance with certain embodiments.

FIG. 16 illustrates an example flow in AES-GCM for using the initialization vectors to generate encrypted ciphertext and an auth tag, which may, in some embodiments, be used as an integrity check value (ICV) for one or more encrypted packets (e.g., TLPs). Although a flow for AES-GCM is depicted and discussed herein, various embodiments of the present disclosure contemplate use of any suitable authenticated encryption mechanism.

In the depicted embodiment, a counter value is encrypted (based on a shared cryptographic key K) and then XORed with plaintext data (e.g., all or a portion of a PCIe packet) to produce encrypted data. The Auth Tag is produced using a series of multiplication operations using unencrypted Additional Authentication Data (AAD), e.g., Auth Data 1, and encrypted data (e.g., Ciphertext 1, Ciphertext 2, etc.) as inputs. For example, a GHASH function may multiply a subkey 'H' (128'h0 encrypted with an encryption key) with a block of AAD (e.g., Auth Data 1) or encrypted data (e.g., ciphertext 120) to generate a GHASH result. In the next iteration, the current GHASH result may be supplied as an input along with another block of AAD and/or encrypted data to generate a new GHASH result. At each iteration, the cumulative GHASH result is supplied as an input with AAD and/or encrypted data to generate a new GHASH result. The final GHASH result forms the basis for an authentication signature for the AAD and encrypted data.

In particular embodiments, when no header information needs to be visible for initial receiver processing or for switch routing, then the entire header of a packet (e.g., a PCIe packet) may be encrypted along with the packet payload and thus no AAD would be used in the AES-GCM algorithm (the entire packet would be encrypted). In other embodiments, even when routing isn't performed, a receiver may peek into the first part of the packet header during processing, and thus this first part of the header may be AAD (e.g., the first DW or 4 bytes of the header) while the remainder of the header and the packet payload would be encrypted. In yet other embodiments, when the address is to be visible, e.g., for switch routing, then the entire header may be AAD and the packet payload would be encrypted.

In one embodiment, replay attack protection may be implemented by using monotonically increasing initialization vectors and verifying that each packet has a higher initialization vector than the previous packet. In another embodiment, the counters are implicitly ordered and the ordering is understood by the transmitter and the receiver. In both of these cases, if the traffic is reordered within the communication fabric, AES-GCM will detect the reordering as an attack and discard the packet. Thus, in order to implement protection using AES-GCM, the communication fabric should be able to deal with dropped packets and should not alter the order of messages sent by the source to the destination. However, the standard PCIe protocol (e.g., as defined in PCI Express® Base Specification Revision 4.0) does not meet either of these conditions. In various embodiments, this impediment may be overcome by maintaining message ordering when AES-GCM is employed between directly connected components via a PCIe link. In other embodiments, additional mechanisms may be introduced in PCIe to maintain ordering in a PCIe fabric with PCIe switches (though in general PCIe switches should be in the trust boundary for protecting the communication of the two fabric agents which increases the trust boundary and complicates the attestation of the platform to the parties that wish to establish trust to it).

While various embodiments disclosed herein focus primarily on PCIe, the techniques described may apply to any similar link technologies. For example, techniques described herein may be applied to link technologies that aren't able to deal with dropped packets and/or alter the order of messages sent by a source to a destination. A non-limiting list of communication protocols to which the techniques described herein may be applied include Cache Coherent Interconnect for Accelerators (CCIX), Open Coherent Accelerator Processor Interface (OpenCAPI™), GenZ™, SuperSpeed Universal Serial Bus (USB), USB4, and Compute Express Link (CXL).

Once a physically protected link is setup (where a physically protected link may refer to a link between endpoints that have agreed upon at least one cryptographic key to be used to protect messages over the link), a cryptographic protocol (e.g., AES-GCM) may be utilized to protect messages sent between endpoints over the link. This disclosure describes both point-to-point (P2P) and end-to-end (E2E) links to deploy AES GCM (or other crypto-algorithm) on a PCIe (or other) interconnect fabric. A P2P link includes a single direct communication path between an Upstream Port and a Downstream Port while an E2E connection may include any arbitrary topology (e.g., through one or more PCIe switches and/or a Root Complex) between any two agents.

Figure 5:
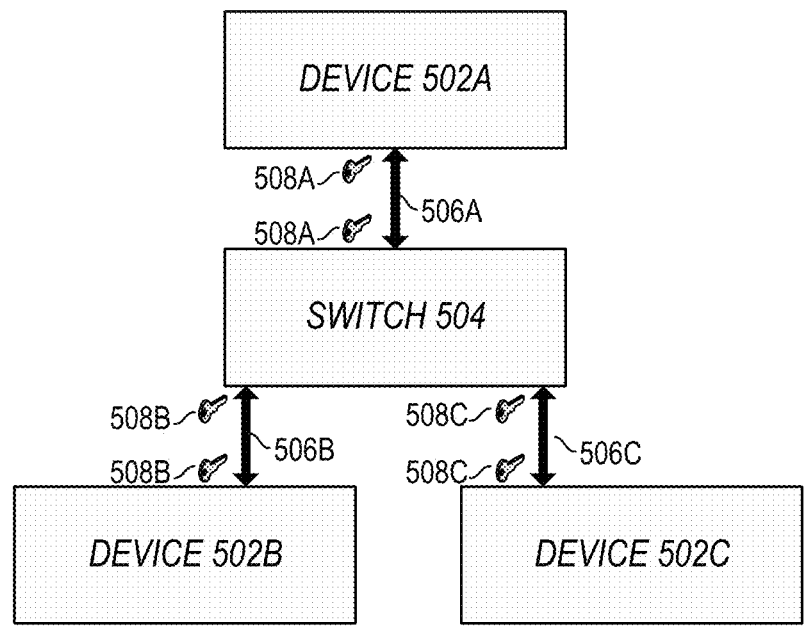
FIG. 5 illustrates a peer-to-peer (P2P) link in accordance with certain embodiments.

FIG. 5 illustrates P2P links 506A-C in accordance with certain embodiments. In FIG. 5, a device 502A has a link with a switch 504 which may be protected by one or more cryptographic keys 508A. The switch 504 has a link with device 502B which may be protected by one or more cryptographic keys 508B and a link with device 502C which may be protected by one or more cryptographic keys 508C.

Figure 6:
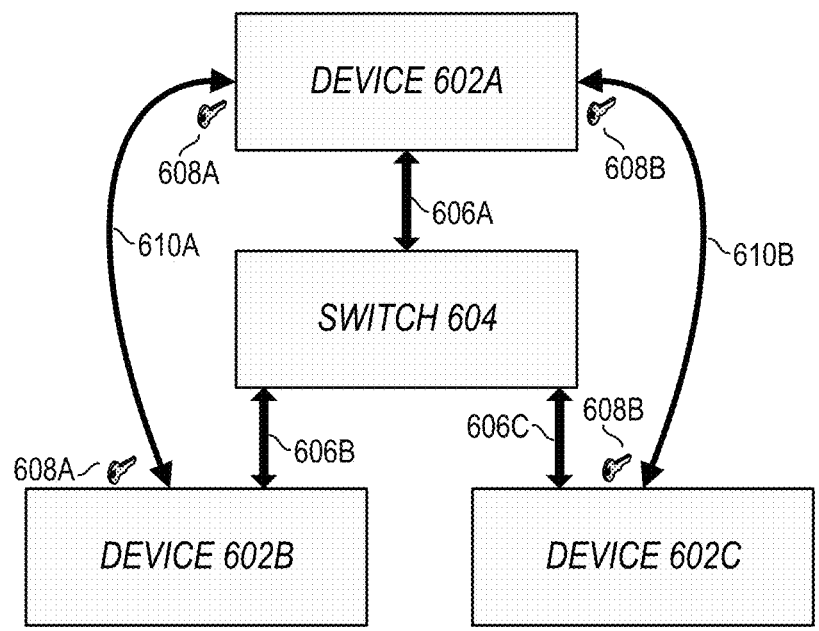
FIG. 6 illustrates an end-to-end (E2E) link in accordance with certain embodiments.

FIG. 6 illustrates E2E links 610A-B in accordance with certain embodiments. In this embodiment, a link 610A from device 602A to 602B (that passes through switch 604) is protected by one or more cryptographic keys 608A while a link 610B from device 602A to 602C (that also passes through switch 604) is protected by one or more cryptographic keys 608B. In this example, contrary to the example of FIG. 5, switch 604 can operate properly in the communication scheme without knowledge of the cryptographic keys used by the endpoints.

Although particular implementations may be discussed herein with respect to a particular link topology (e.g., P2P or E2E), in various embodiments the implementations disclosed herein may be used with any suitable link topology.

When physical protection over a link is desired, a key exchange may be performed over the link by the endpoints. In one embodiment, key exchange is performed through logical PCIe Protection Management Entities. In some embodiments, this may involve utilization of an in-band register set (e.g., mailbox) mechanism for authentication & measurement procedures. In some embodiments, before the key exchange is performed, authentication of both immutable characteristics (e.g., hardware attributes) of the endpoint devices and mutable characteristics (e.g., software or firmware attributes) may be performed. Additionally, during this initialization process, support for encryption at both Upstream and Downstream Ports may be discovered. In one embodiment, the key exchange is performed as part of the authentication flow. In another embodiment, the key exchange is performed as a separate flow. Alternatively, an in-band messaging mechanism may be used, provided there is a way to securely establish the correspondence between the specific link and the out-of-band connection. Key exchange can also be done through hardware-driven means, for example by using PCIe Messages (e.g., Management Component Transport Protocol (MCTP) tunneling messages or messages with new formats designed specifically for this purpose). In this case, the key exchange may be triggered and managed by the setup/management mechanisms discussed below, which, in various embodiments, may operate partly or completely independently of software running on the endpoints. In various embodiments, the key exchange may be performed in any suitable implementation-specific manner. In a particular embodiment, the key exchange may result in a shared secret being established between the endpoints which will be used to create a key chain comprising multiple derived keys.

Figure 7:
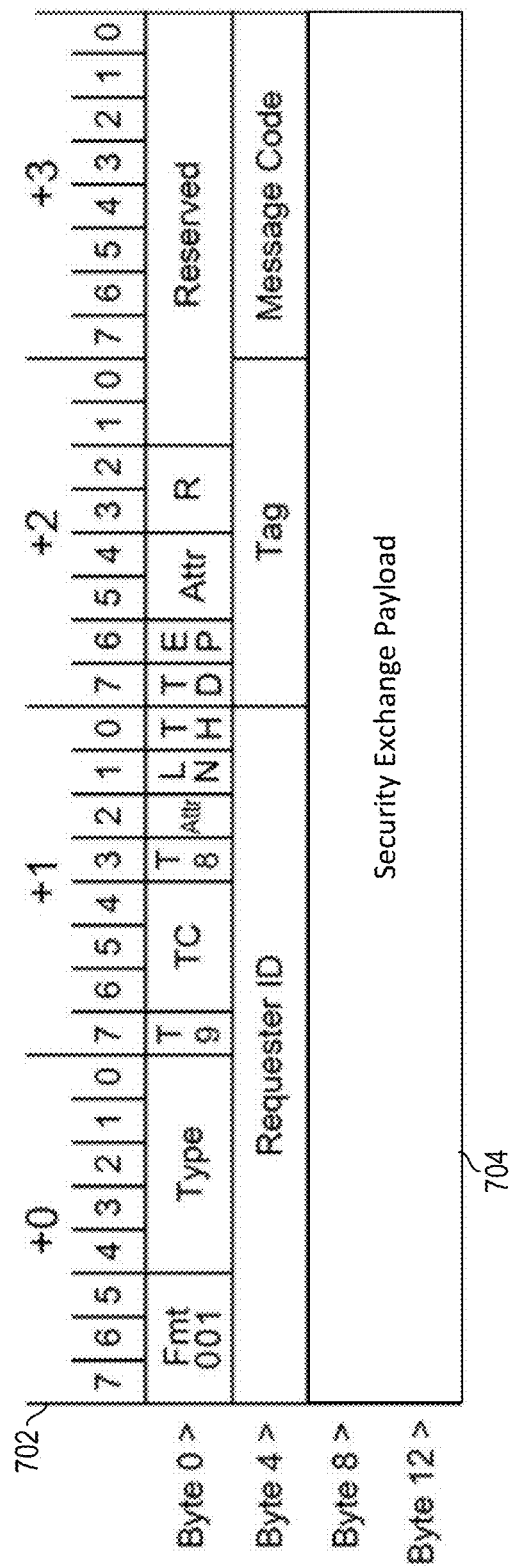
FIG. 7 illustrates a message for communicating a security exchange payload in accordance with certain embodiments.

The setup of a physically protected link would start with a trigger, e.g., via a new control bit ("e.g., Link Encryption On") added to the Downstream Port. For example, a bit to indicate this trigger may be included in the Link Control 3 Register of the Secondary PCI Express Extended Capability Structure. In various embodiments, any of the reserved (RsvdP) bits (such as bit 2 as indicated in FIG. 7-69) of the Link Control 3 Register may be used as the control bit to trigger link protection. In other embodiments, any suitable message passed between the endpoints may trigger the configuration of a physically protected link.

Before triggering the setup, optional parameters such as the activation and configuration of the integrity mechanism may be communicated between link partners. For example, the size of the integrity check value (ICV) and, if the ICVs are not applied on a per TLP basis, the frequency/window of ICV application may be communicated. The ICVs will be described in more detail below. Once triggered, the Downstream Port sends an "Initiate Secure Link" Message to the Upstream Port, and all TLP Link traffic is blocked (e.g., by hardware) in both directions until the protected link has been established. If the key exchange has not already been performed at the time of the triggering, then the key exchange may be performed at this time. In various embodiments, the information associated with the key exchange may be communicated through a message-based mechanism. FIG. 7 depicts an example message 702 that may be used to carry a security exchange payload 704 during key exchange. The message depicted is a Message Request with data payload (MsgD) as defined in PCI Express. In various embodiments, the key exchange may be performed without software interaction.

Since run-time key exchange may be required depending on the implementation, in various embodiments it is desirable to support this message-based mechanism and to use the same mechanism for both the initial key exchange and all subsequent key exchanges. Once the initial key exchange has been completed, each Port transmits a "Secure Link Established" message to the other Port. This message may itself be encrypted (along with all subsequent link traffic). TLP traffic may then be unblocked and normal operation of the (now protected) link begins (or resumes if this process was performed to reestablish protection). The link key management protocols described herein may also be used for integrity protected synchronization of any protocol parameters, such as counters (e.g., initialization vectors), other operational parameters identified herein, or other suitable protocol parameters.

If an attempt to establish an encrypted link fails (including, e.g., detection of any unexpected behavior observed in the handshake) the link is forced to a Disabled state until the trigger bit has been cleared. In an embodiment, clearing the "Link Encryption On" bit will set the "Link Disable" bit, and the link is constrained to remain in the Disabled state until the "Link Disable" bit is cleared to avoid attacks in which an adversary turns off link security. Additional error status information (e.g., describing an error encountered in the setup of the protected link) may be provided. In one example, such error status information may be included in the same mechanism as the trigger bit (e.g., the Link Status 3 Register).

As alluded to above, one of the difficulties in establishing Transaction Layer encryption over PCIe is that TLP traffic is subject to reordering, and stream ciphers suitable for encrypting communication channels only work for in-order traffic. In various embodiments, this issue may be resolved by applying counters separately to different types of TLPs and/or sequence numbers may be added to enable TLPs to be returned to the original transmission order. However, such solutions may include relatively large performance compromises in order to bound the number of reordered TLPs. Typically, the Requester (e.g., endpoint requesting an operation) and Completer (e.g., endpoint performing the request) may implement end-to-end flow control, or, if an assumption is made that Posted Requests will flow in-order (e.g., by disallowing Relaxed Ordering), then the flow control handshake can be implicit based on the number of outstanding Non-Posted Requests. For example, during the setup of the encrypted connection, or by pre-arrangement, the Requester may be configured to know that the Completer can buffer up to, e.g., 4 Non-Posted Requests. The Requester would then implement a policy that no more than 4 Non-Posted Requests can be outstanding over the encrypted connection so as to ensure that any amount of reordering can be handled. For example, Requests issued 1,2,3,4 may be received in order 4,3,2,1 and then restored to their original order. These solutions and others are explained in more detail below.

Various solutions are contemplated herein for overcoming the reordering challenge presented by PCIe. In one embodiment, the PCIe ordering rules may be altered. For example, all reordering could be eliminated. However, PCIe relies on reordering for proper operation and improved performance. The PCIe ordering rules are fundamental in supporting the PCIe consumer-producer ordering model, in managing buffers, and in avoiding deadlocks. Accordingly, such an implementation may fundamentally transform the operation of PCIe.

In another embodiment, the ordering rules of PCIe are modified such that Posted Requests, Non-Posted Requests, and Completions are treated as independent streams and each stream is protected with a different cryptographic key and counter (e.g., initialization vector) sequence. This approach results in a much smaller set of ordering rules to change, leading to a much smaller impact on the PCIe operation.

FIG. 8A depicts a simplified chart of the standard PCIe ordering rules in accordance with certain embodiments and FIG. 8B depicts a simplified chart of modified PCIe ordering rules that enable usage of cryptographic algorithms to protect messages when Posted Requests, Non-Posted Requests, and Completions are treated as independent streams and each stream is protected with a different cryptographic key and IV sequence. FIG. 8A is reproduced from the PCIe Base Spec Section 4.0.2.4. FIGS. 8A and 8B and the following explanation reference Posted Requests, Read Requests, and Non-Posted Requests (NPRs), and Completions. In general, Non-Posted Requests are requests for which the Requester expects to receive a Completion from the device completing the request. Posted Requests are ones where the Requester does not expect to and will not receive a Completion. Completions are responses to Requests. In one embodiment consistent with the current version of PCIe, a Posted Request is a Memory Write Request or a Message Request; a Read Request is a Configuration Read Request, an I/O Read Request, or a Memory Read Request; an NPR with Data is a Configuration Write Request, an I/O Write Request, or an AtomicOp Request; and a Non-Posted Request is a Read Request or an NPR with Data.

A simplified explanation of the rules is as follows (with reference to the columns and rows specified in FIG. 8A):

A3, A4, D3, D4: A Posted Request or Completion must be able to pass Non-Posted Requests to avoid deadlocks.

A2, B2B, C2B, D2B: A Posted Request or an NPR with Data or Completion with Relaxed Order bit set may pass a Posted Request. A Posted Request or Read Request or NPR with Data or Completion with ID Order bit set may pass a Posted Request if the two Requester IDs are different. An I/O or Configuration Write Completion may pass a Posted Request.

A5a, D5a: Posted Requests may pass Completions. Completions with different Transaction IDs may pass each other.

B3, B4, C3, C4, B5, C5: A Non-Posted Request may pass a Non-Posted Request or a Completion.

A5b: Inside a PCI Express to PCI/PCI-X Bridge whose PCI/PCI-X bus segment is operating in conventional PCI mode, for transactions traveling in the PCI Express to PCI direction, a Posted Request must be able to pass Completions to avoid deadlock.

FIG. 8B illustrates a modified communication ordering scheme enabling encrypted link communication in accordance with certain embodiments. In the modified ordering scheme depicted in FIG. 8B, a Posted Request or a Completion is able to pass Non-Posted Requests to avoid deadlocks. However, in this scheme, no other passing is allowed.

Employing AES-GCM in this manner (e.g., by modifying the ordering rules and treating Posted Requests, Non-Posted Requests, and Completions as independent streams and protecting each stream with a different cryptographic key and counter sequence) may create an opportunity for new attacks that selectively interfere with traffic in one of the three streams. To address such attacks, additional mitigation mechanisms may be employed in various embodiments. For example, a counter may be maintained at the sender that counts the number of Posted Requests and Completion Requests that have been sent. Similarly, a counter may be maintained at the receiver that counts the number of Posted Requests and Completion Requests that have been received. Every Non-Posted request may then carry a copy of the current counter value at the sender. The receiver checks the counter value included in the Non-Posted Request against the value of its local counter to ensure that the received counter value is not higher than its local value, which confirms the interconnect properly forwarded all Posted and Completion Requests that were sent before the Non-Posted request.

Figure 9:
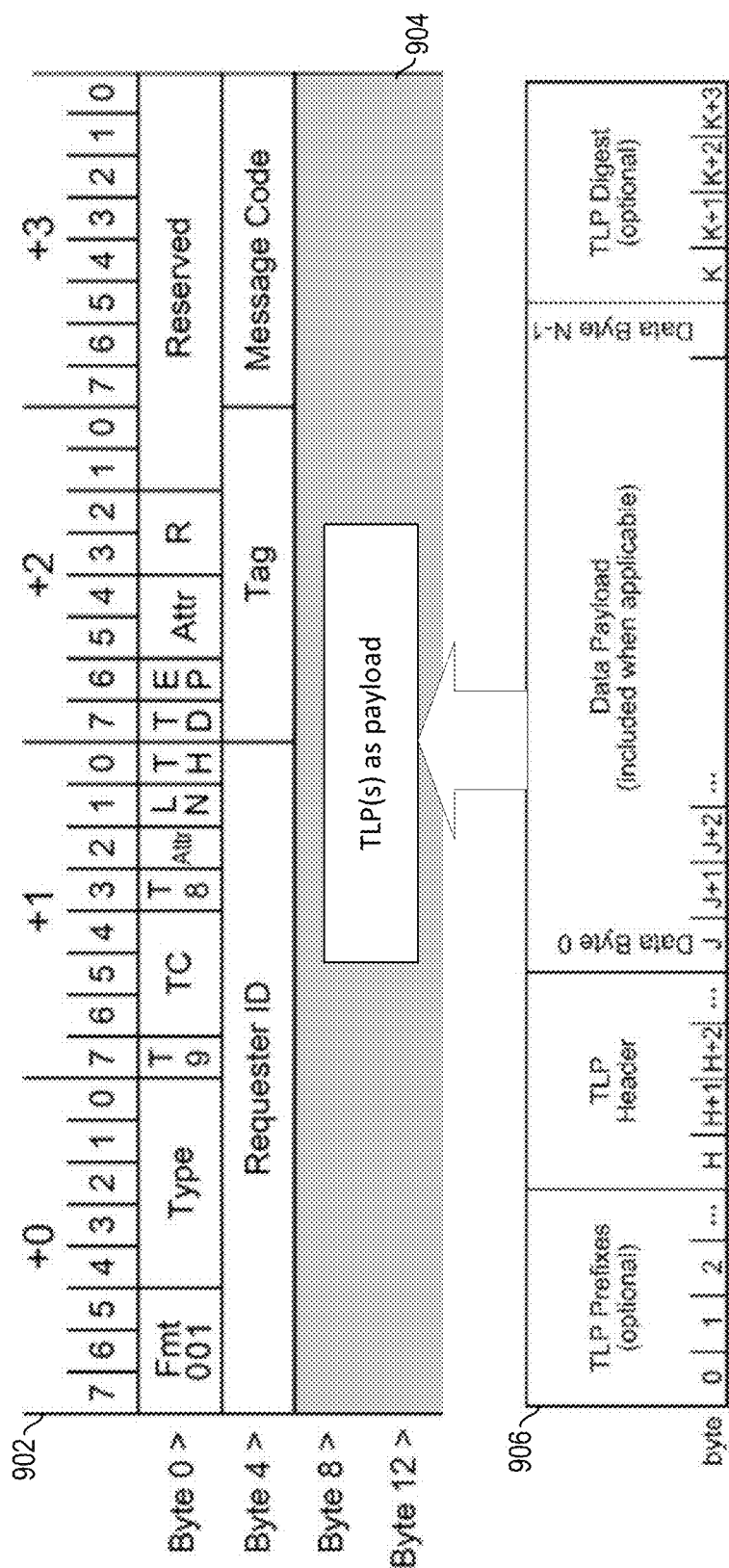
FIG. 9 illustrates a message for tunneling one or more transaction layer packets (TLPs) in accordance with certain embodiments.

FIG. 9 illustrates a message for tunneling one or more TLPs in accordance with certain embodiments. To avoid the added complexity in implementations addressing recording, in some embodiments, AES-GCM may be employed on an E2E link by utilizing a tunneling protocol that tunnels PCIe traffic over PCIe using PCIe messages (e.g., Posted Requests) which are guaranteed to be ordered between the source and the destination. In such an implementation, the Relaxed Ordering (RO) bit is not set in such messages in order to avoid reordering of the messages by an intermediate entity in the link.

In such embodiments, ID based ordering (IDO) may still be used because ordering is maintained for a specific Requester/Completer pair. Additionally, to support such tunneling, new mechanisms for buffer management and deadlock avoidance may be introduced between the tunnel Endpoints, but such support may be limited to the ingress and egress points in the PCIe fabric, thereby reducing the overall impact of the change. Accordingly, the introduction of the tunneling may be implemented such that existing PCIe Switches (and some Root Complex implementations) do not need to be modified to support the tunneling (e.g., they will just allow the tunneled traffic to pass through). Additional benefits to the tunneling approach include, e.g., enablement of quality of service and other policy mechanisms at the platform level.

In various embodiments "Virtual Links" may be established where concepts similar to those currently applied at the Link Level for flow control and ordering may be applied over a connection across an arbitrary PCIe topology connecting two entities. For example, a connection between two PCIe elements, RID1 and RID2, may be established such that all traffic between the two elements is encapsulated, as discussed above, in PCIe Messages (e.g., a Message Request with data payload (MsgD)) routed by ID between the two elements, providing end-to-end in-order traffic flows (e.g., in the ordering table above, see entry Ata which describes that Posted Requests are not to pass each other).

In one embodiment, the format of such messages may take the form depicted in FIG. 9. In the embodiment depicted, one or more TLPs 906 (which may include, e.g., Posted Requests, NPRs, and Completions) may be included in the payload field 904 of a MsgD 902 as depicted. In various embodiments, only the Transaction Layer TLP content is included in the payload and the Sequence Number and LCRC are omitted from this payload.

Figure 10:
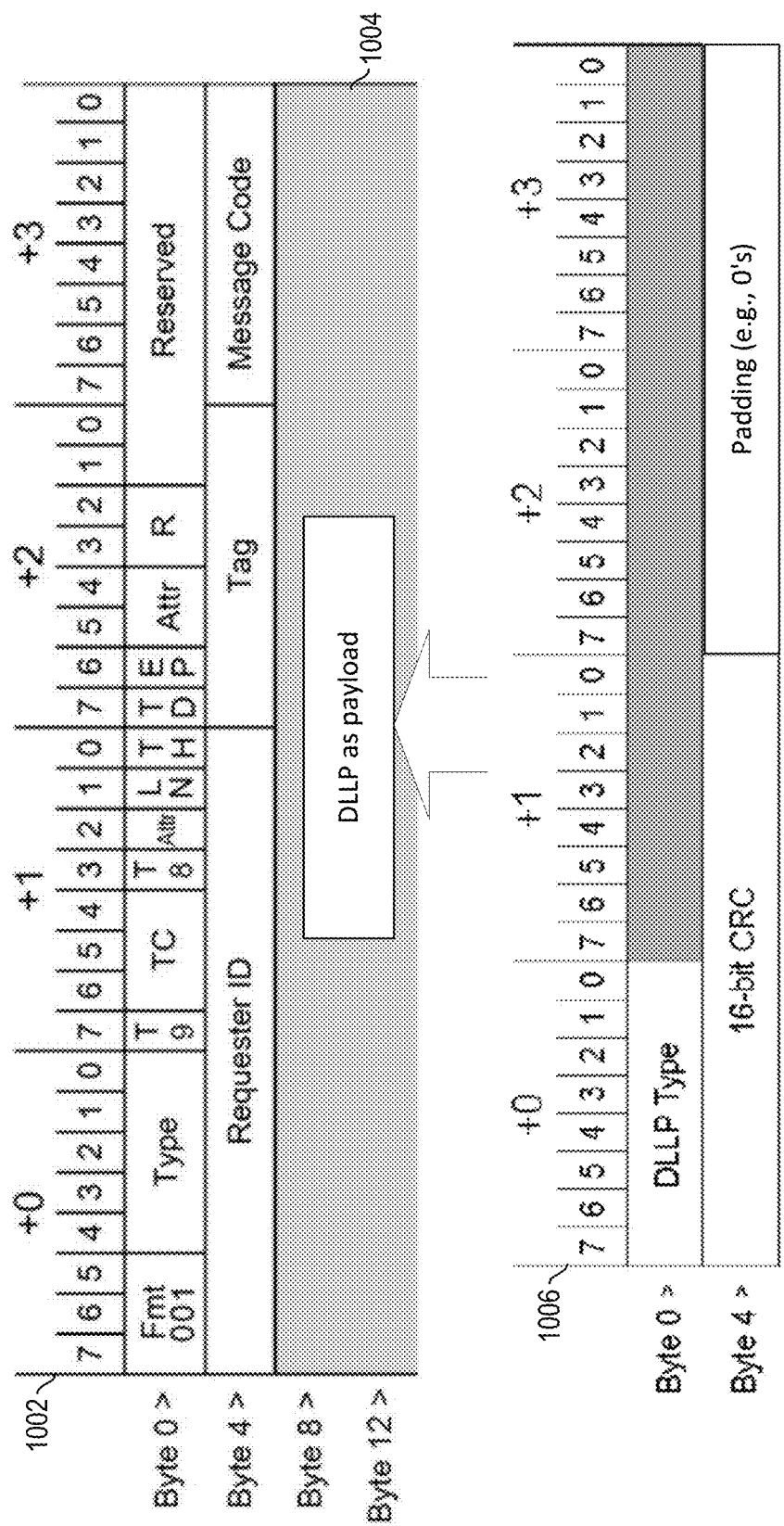
FIG. 10 illustrates a message for tunneling a data link layer packet (DLLP) in accordance with certain embodiments.

FIG. 10 illustrates a message 1002 for tunneling a data link layer packet (DLLP) 1006 in accordance with certain embodiments. In various embodiments, DLLP traffic may be virtualized (e.g., via tunneling) in a manner that is similar to the manner in which the TLP traffic is virtualized. As one example, a DLLP packet 1006 may tunneled by inclusion within the payload field 1004 of another message (e.g., MsgD). Similarly, Flow Control and other Link management functions may be tunneled across the link within another message not subject to reordering, such as MsgD.

Instead of using Route-by-ID Messages for the tunneling mechanism, other embodiments may use Messages routed in other ways, or Memory Write TLPs, in which the data payload of such messages is the tunneled TLP/DLLP content. In other embodiments, other tunneling protocols, e.g., Thunderbolt, can be used to tunnel the TLP/DLLP content.

In embodiments in which the Virtual Link uses a mechanism such as the one described hereafter substituting the ICV for the LCRC, the link retry mechanisms (e.g., retransmission requests when errors are encountered) may be applied at the Virtual Link. However, not all link operations are required for Virtual Links, and to avoid wasted bandwidth in various embodiments, only the required elements are used. To software running on the endpoint devices, the Virtual Link may appear the same as a single PCIe link (e.g., a P2P link).

The association of this tunnel with specific agents may be accomplished using the concept of "Virtual Ports", where a Root Complex or endpoint device may associate a specific Requester/Completer ID with a Virtual Port. For an endpoint device this may be done using the existing Single Root 10 Virtualization (SR-IOV) mechanisms. By trivial extension the same ideas can be used to establish Virtual Root Ports. Some type of "connection manager" logic may be utilized to establish the secure connection between any two specific elements—for example, this may be done by a virtual machine monitor (VMM) as an aspect of composing a virtual machine (VM) instance. If two Endpoint virtual functions (VFs) are connected peer-to-peer then one should be designated as a Virtual Downstream Port (since an Endpoint Port would typically be an Upstream Port). Once the association has been made, then the secure connection may be established and managed using the mechanisms described above for protected links.

As is already established and understood with respect to SR-IOV, any PCIe mechanisms applying only to physical links need not be implemented for Virtual Links and may be omitted in various embodiments. Virtual Ports are not limited to working within the existing SR-IOV framework, but may also be implemented using different and/or extended mechanisms, including those that apply Process Address Space ID (PASID) in addition (or instead of) using the Requester ID (RID) as the basic unit of association. However, in these cases the E2E Tunneling Messages may still be routed by ID.

As described above, integrity checking may be implemented on a protected link to provide an assurance that the data transmitted is the same as the data received. For efficiency reasons, whether the integrity checking is performed at the TLP level or at the link layer level, it may be desirable to have the integrity check cover more than one TLP. This, however, presents practical problems in handling integrity check failures. The simplest approach is to buffer all received TLPs and only release them for further processing when the integrity check has been passed. However, this may involve significant buffering and additional latency. One embodiment includes a "shoot down" mechanism where TLP processing is not postponed awaiting an integrity check, but if the integrity check fails then there are forward "bypass" mechanisms, which may be as simple as a signal that passes later pipeline stages, and indicates that the effects of the TLPs that failed the integrity checks are not to be committed (e.g., made irreversible). One special case where this may be easily done is when synchronizing TLPs, e.g. flag writes, can be identified, e.g., by means of special knowledge at the Requester, and the integrity check is scheduled to immediately precede and follow these synchronizing TLPs.

In a particular embodiment, the encryption hardware may be placed in a interface between the PHY layer and the link layer. For example, such an interface may comprise a PIPE interface as described at https://www.intel.com/content/www/us/en/io/pci-express/phy-interface-pci-express-sata-usb31-architectures.html. In addition to being a convenient boundary between IP blocks, traffic at such an interface flows in order, as needed for stream ciphers that are suitable for encrypting a communication channel. An additional benefit is that many protocols use the PIPE interface, and so in various embodiments the same encryption hardware may be applied to multiple interface types (e.g., IAL, Flexbus, Ultra Path Interconnect (UPI), or others) being operated over a common PHY.

However, implementing encryption, and especially integrity, at this level poses significant challenges because there is no guaranteed delivery at this level in the link protocol, which makes it difficult to ensure that the Tx/Rx counters (e.g., initialization vectors) remain in sync, when a block cipher operating in counter mode is used as a stream cipher, e.g., AES-GCM.

The counter sync problem is, however, very similar to the scrambling mechanism that PCIe already uses (e.g., as described in PCIe Base Specification 4.2.1.3). However, for scrambling, PCIe always resets to the same starting values, whereas for counter sync for encryption, the counter generally should move forward in the sequence such that a counter value is not reused for the same encryption key. A key observation is that at the PIPE (or other interface between the PHY and the link layer) level there is a fairly precise idea of time shared by both components on the link, and this may be used to establish a rule based on time windows that ensures both components will update their counters to the same sync points. Both components may maintain running clocks across resync events so that they maintain approximate alignment in wall clock time.

Events that may trigger resync of the counters are Skip Ordered Sets (which are relatively short) and link retraining (which is relatively long). When a resync trigger occurs, especially in the case of a link retrain, it is possible the two components will observe the event starting and ending at different times. In order to address this, a window associated with the detection of the trigger may be established. A subsequent resync point to which both components advance their counters may also be configured. In the link retraining case, it is reasonable to assume that a retrain cannot take less than some amount of time, such as 1 μs (in various implementations this value may change over time and would have a dependency on the data rate).

Various embodiments may include logic to ensure that no retraining event is allowed to happen more quickly than this window, and that each component will, if needed, add delay to a retrain event to ensure that two or more retrains cannot occur within a single window. Such constraints are not guaranteed by PCIe itself today but may be enforced, e.g., at the PIPE or similar boundary by, for example, blocking the transfer of Training Sets selectively to ensure that the retraining process consumes the required amount of time.

On exiting any resync event, both components advance their counters to the next "round" sync point (in some situations one or more values in the sequence may be skipped during the sync) based on the event type and the associated minimum expected event length. As an example, Component 1 triggers a retrain at TimeX and component 2 observes the retrain starting at TimeX+Y. Both components follow the link retraining protocol (e.g., as defined in the PCIe spec), with the modification that each component ensures that the retraining protocol procedures take at least the minimum expected event length (e.g., 1 μs in the example above). Upon completing the retraining protocol, both components reset their counters (which may include multiple counters if separate counters are used for different types of messages) to the next sync point, e.g., as defined by the next value that would have been reached at Time Z where the value may be determined in any suitable manner, such as by one of the following approaches:

(1) Switch to the next predetermined encryption key and reset the counter to zero. For this approach, at least two keys may be available (the current key and an alternate key) to avoid run-time delays of establishing a new key. Alternatively, key generation may be sufficiently fast to avoid disrupting traffic in progress. In various embodiments, multiple keys in a key chain are generated during initialization (each key being identified by their unique KeyID), and during the sync the switch may occur to the same KeyID.

(2) Establish the concept of Odd and Even Sync Points, where bit position X will be either 1 (Odd) or 0 (Even) and advance the counter to set bits less significant than X to zeroes, and indicate in the Messages conveying the Training/Skip Ordered Sets whether the Odd or Even jump is to be made. X should be chosen such that the time interval that would cause bit X to toggle during normal operation is much larger (say 4-10×) than the longest period of time that would be required for the receiver to determine that the transmitter of the other component has initiated/responded to the retrain/skip event. Because Skip Ordered Sets are detected immediately the time will be very short. However, for retrain events a jump equivalent to 10-100 microseconds would be appropriate as the detection window is less precise.

As a variation on (2), the counters at both the transmitter and receiver may continue to operate in "open loop" when synchronization is lost, which would enable a smaller jump to be made when reestablishing sync, although the calculation of the maximum deviation would need to account for the clocking architecture, including any Retimers on the Link.

As an alternative or addition to (2) or (3), if the degree of misalignment can be bounded, e.g., to one of two counter value choices, the receiver could apply both counter values to the initial data received after the sync event, and then determine which is the correct one.

Send the counter (with the restriction that the counter must only go forward), for example, by transmission of one or more (e.g., for redundancy) data link layer packets (DLLPs) with the counter value (or a portion thereof) prior to resumption of TLP transmissions.

When encryption/integrity features are enabled, the operation of certain power management states may be modified to ensure that proper counter sync can be maintained.

One approach to integrity checking that is especially appealing if encryption is performed at the PIPE interface is to add the ICV periodically on the link, for example based on a fixed schedule, or immediately following or included in each Skip Ordered Set (e.g., by setting Bit 7 of Symbol 4N+2 and using some or all of the reserved bits or by using other bits of the Skip Ordered Set), which already establishes a regular synchronization point between the two components.

In some embodiments, the encryption circuitry may be implemented within the data link layer and may replace a message's cyclic redundancy check (CRC) field with the integrity check value (ICV). In various embodiments, the ICV value is calculated by a suitable checksum algorithm applied to the TLP following application of the sequence number application and including all bits of the TLP. In various embodiments, the ICV value is an auth tag of AES-GCM or similar tag created based in part on a cryptographic key shared between transmitter and receiver.

Figure 11:
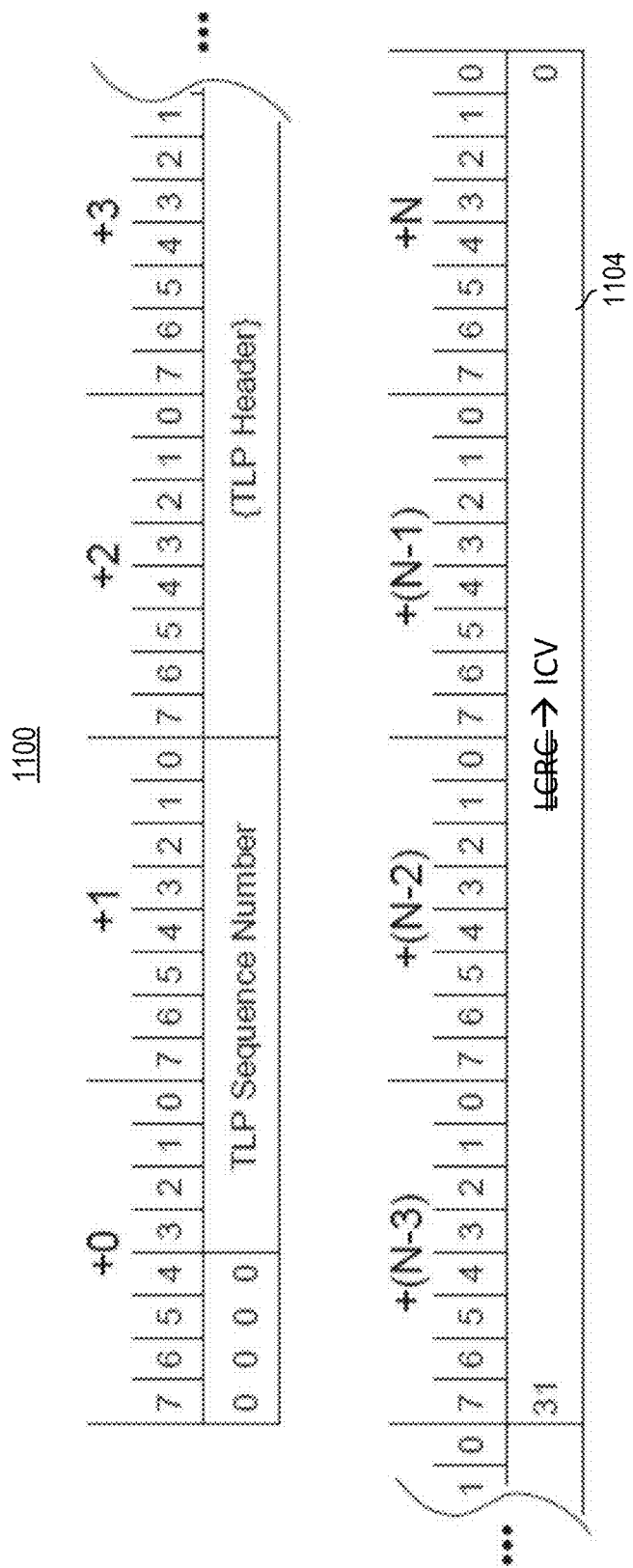
FIG. 11 illustrates a TLP with an integrity check value in an LCRC field in accordance with certain embodiments.

In PCIe, a 32-bit CRC code called an LCRC may be used within the Data Link Layer to detect errors in TLPs and cause retransmits, while in the Transaction Layer, a 32-bit CRC called an ECRC may be placed in the TLP Digest field at the end of a TLP. In various embodiments, an integrity checksum may be included in a message in the field normally reserved for the ECRC or LCRC. For example, FIG. 11 depicts a TLP 1100 with an LCRC field 1104 that may be used to carry the ICV. In scenarios in which a 32-bit integrity checksum is acceptable, this approach results in no increase in link overhead traffic. Even if a larger (e.g., 64 bit or 128 bit) integrity checksum is used, this approach still has the significant advantage that a violation can be isolated to a specific TLP, greatly simplifying the check, reducing latency, and providing more flexibility in the handling of violations. Provided the integrity check is chosen such that it is guaranteed to provide sufficient coverage against bit errors, there is no loss of error coverage, and the handling of an integrity check failure is often well aligned with error handling.

At the data link layer, replacing the LCRC with the ICV can achieve several benefits. If a 32 b ICV is acceptable, then no additional bandwidth need be consumed. Alternately, longer ICVs, e.g. 64 b, 96 b or 128 b, can be implemented, and although this would require modification to the TLP processing circuits, the modifications can be limited to the Data Link Layer, avoiding the need to modify Transaction Layer data paths and buffers (which would also add cost).

The current behaviors associated with LCRC check failures would generally work well for integrity check failures as well. Because these mechanisms already exist, and are intended to make it highly likely that bit errors are corrected by subsequent retransmission, extending the LCRC mechanisms to handle integrity checks is both simple and low cost, and also highly robust in that only true attack scenarios will be escalated to higher level handlers, because errors are transient and so will typically be resolved by the existing retry mechanisms, whereas an attack, in order to be successful, would need to be repeated until successful, creating a pattern of an apparent recurring "error" that could be discerned from true error cases by means of a filter. Moreover, repeated failures of the integrity check will result in a link retrain after a tightly bounded retry attempt, result in re-syncing or key re-establishment which will help protect against attacks. In various embodiments, an uncorrectable integrity check failure will result in retraining of the link and renegotiation of the session key establishment to set up a new protected link session. Additionally, the setup/teardown and management mechanisms for P2P approaches are straightforward.

In some embodiments, the integrity checksum may replace the ECRC rather than the LCRC, though there are some drawbacks to doing this. The recovery mechanisms are not defined in PCIe, so handling will not necessarily be consistent unless new handling mechanisms are defined. However, doing so makes the scheme less attractive as new handling mechanisms will make the scheme operate less like ECRC handling today. However, replacing ECRC with the ICV may be attractive for E2E approaches.

Figure 12:
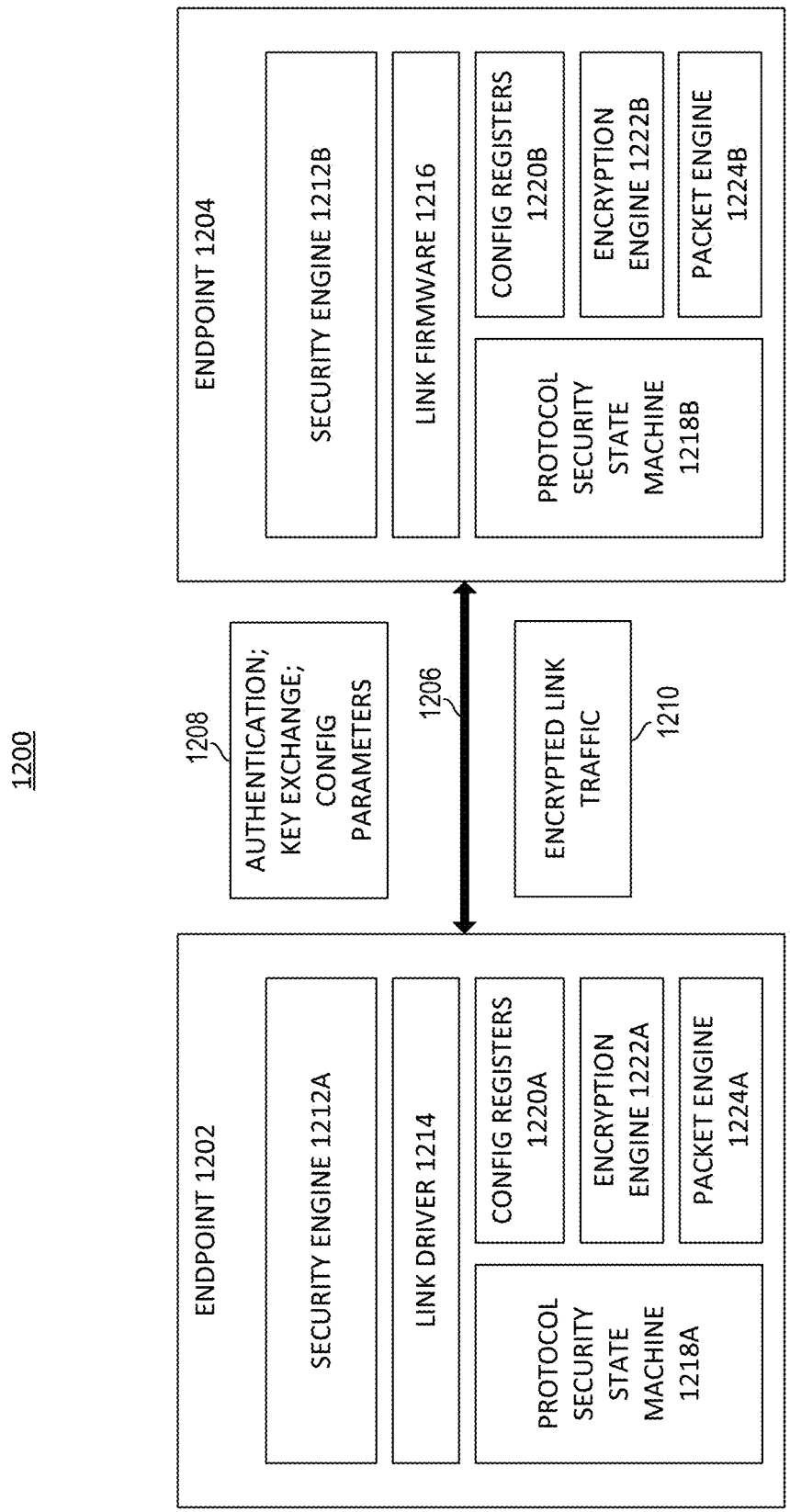
FIG. 12 illustrates a system for communicating encrypted data over a protected link in accordance with certain embodiments.

FIG. 12 illustrates a system 1200 for communicating encrypted data over a protected link in accordance with certain embodiments. Endpoint 1202 may communicate with endpoint 1204 over a link 1206. Each endpoint includes a security engine 1212, a protocol security state machine 1218, configuration registers 1220, encryption engine 1222, and packet engine 1224. Endpoint 1202 includes a link driver 1214 and endpoint 1204 includes link firmware 1216. Endpoint 1202 may be a host computing device, such as an SoC or other processing device.

In order to set up protection on the link 1206, the endpoints 1202 and 1204 may, through their respective security engines 1212, exchange various information 1208, such as authentication data, cryptographic key information, and other configuration parameters. Once the link has been protected, packets may be generated by packet engines 1224, encrypted by encryption engines 1222 to generate encrypted link traffic 1210 which is then communicated between the endpoint 1202 and endpoint 1204.

Figure 13:
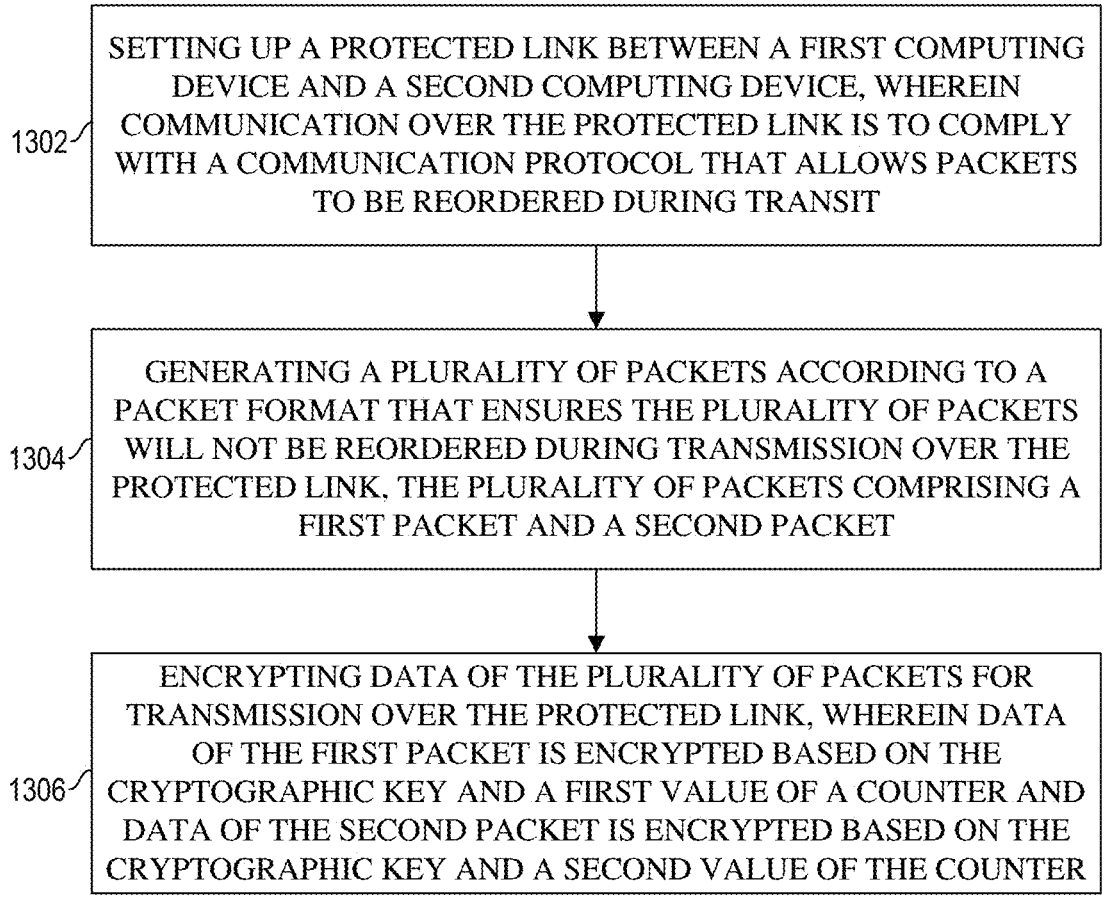
FIG. 13 illustrates a flow for communicating encrypted data over a protected link in accordance with certain embodiments.

FIG. 13 illustrates a flow for communicating encrypted data over a protected link in accordance with certain embodiments. The flow of FIG. 13 may be executed by computing devices 502, 602, endpoint 1202, processor 1400, or other suitable computing devices.

1302 includes setting up a protected link between a first computing device and a second computing device, wherein communication over the protected link is to comply with a communication protocol that allows packets to be reordered during transit. 1304 includes generating a plurality of packets according to a packet format that ensures the plurality of packets will not be reordered during transmission over the protected link, the plurality of packets comprising a first packet and a second packet. 1306 includes encrypting the plurality of packets for transmission over the protected link, wherein the first packet is encrypted based on the cryptographic key and a first value of a counter and the second packet is encrypted based on the cryptographic key and a second value of the counter.

Some of the blocks illustrated in FIG. 13 may be repeated, combined, modified or deleted where appropriate, and additional blocks may also be added to the flowchart. Additionally, blocks may be performed in any suitable order without departing from the scope of particular embodiments.

While some of the embodiments discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Note that the apparatuses, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures. For instance, a host and device may be implemented, which are equipped with functionality to implement security mechanism as discussed in the examples above, in any one of a variety of computing architectures (e.g., using any one of a variety of different interconnects or fabrics). For instance, a host may connect to a device supporting the security mechanisms within a personal computing system (e.g., implemented in a laptop, desktop, mobile, smartphone, Internet of Things (IoT) device, smart appliance, gaming console, media console, etc.). In another example, a host may connect to a device supporting the security mechanisms within a server computing system (e.g., a rack server, blade server, tower server, rack scale server architecture or other disaggregated server architecture), among other examples.

Figure 14:
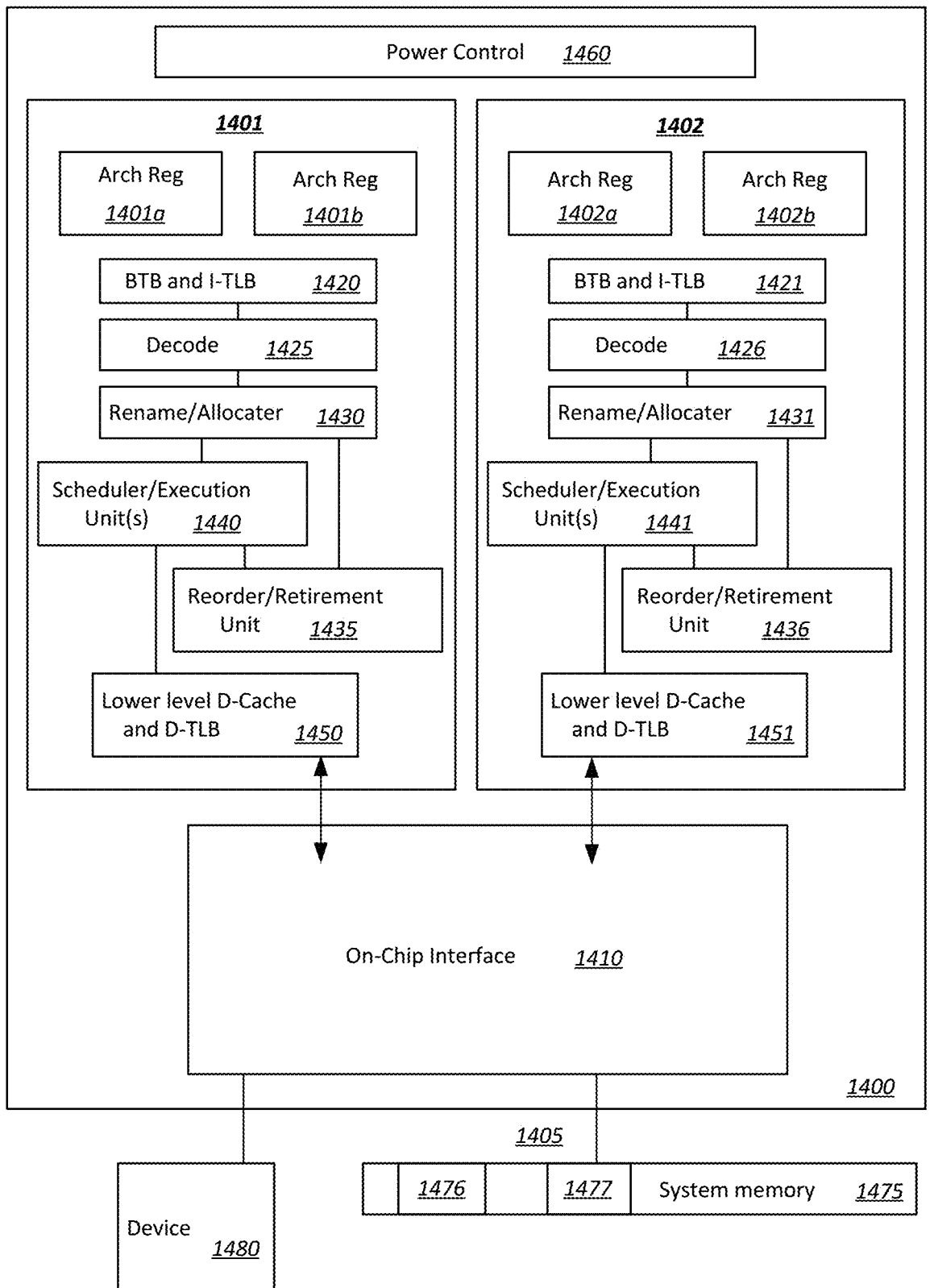
FIG. 14 illustrates a block diagram for a computing system including a multicore processor in accordance with certain embodiments.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores—core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores—core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (1401a, 1401b, 1402a, and 1402b) may be referred to as processing elements, thread slots, or thread units, as described above. As illustrated, architecture state registers 1401a are replicated in architecture state registers 1401b, so individual architecture states/contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401*a*, 1401*b*, respectively. Usually core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401*a* and 1401*b* are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
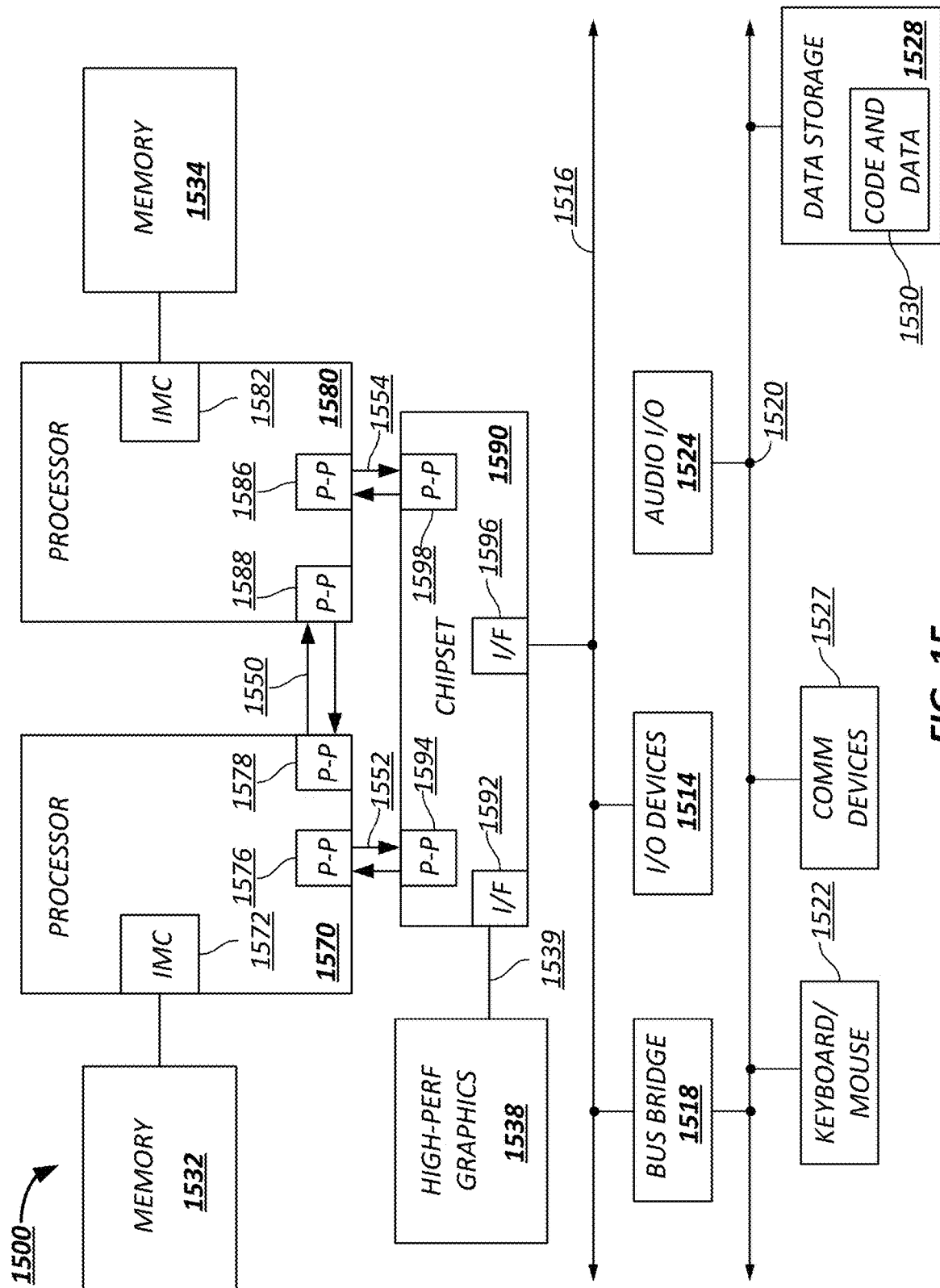
FIG. 15 illustrates a block diagram of a computing system including multiple processors in accordance with certain embodiments.

Referring now to FIG. 15, shown is a block diagram of another system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as a high-performance architecture. As a result, the invention may be implemented within the QPI architecture.

While shown with only two processors 1570, 1580, it is to be understood that the scope of the present invention is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module or engine as used herein refers to any combination of hardware, software, and/or firmware. As an example, a module or engine includes hardware, such as a micro-controller, associated with a non-transitory medium to store code adapted to be executed by the micro-controller.

Therefore, reference to a module or engine, in one embodiment, refers to the hardware, which is specifically configured to recognize and/or execute the code to be held on a non-transitory medium. Furthermore, in another embodiment, use of a module or engine refers to the non-transitory medium including the code, which is specifically adapted to be executed by the microcontroller to perform predetermined operations. And as can be inferred, in yet another embodiment, the term module or engine (in this example) may refer to the combination of the microcontroller and the non-transitory medium. Often module or engine boundaries that are illustrated as separate commonly vary and potentially overlap. For example, a first and a second module or engine may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is a computing device comprising a memory to store a cryptographic key; a security engine comprising circuitry, the security engine to setup a protected link between the computing device and a second computing device, wherein communication over the link is to comply with a communication protocol that allows packets to be reordered during transit; a packet engine comprising circuitry, the packet engine to generate a plurality of packets according to a packet format that ensures the plurality of packets will not be reordered during transmission over the protected link, the plurality of packets comprising a first packet and a second packet; and an encryption engine comprising circuitry, the encryption engine to encrypt data of the plurality of packets for transmission over the protected link, wherein the encryption engine is to encrypt data of the first packet based on the cryptographic key and a first value of a counter and to encrypt data of the second packet based on the cryptographic key and a second value of the counter.

Example 2 may include the subject matter of example 1, wherein the communication protocol is a Peripheral Component Interconnect Express (PCI Express) protocol.

Example 3 may include the subject matter of any of examples 1-2, wherein the encryption engine is to encrypt data of the plurality of packets according to Advanced Encryption Standard (AES) implemented in the Galois Counter Mode (GCM).

Example 4 may include the subject matter of any of examples 1-3, wherein the packet engine is to encapsulate a packet that is reorderable according to the communication protocol within another packet that is not reorderable by the communication protocol.

Example 5 may include the subject matter of example 4, wherein the packet that is reorderable according to the communication protocol is encapsulated within a PCI Express Posted Request message.

Example 6 may include the subject matter of any of examples 1-5, wherein the encryption engine is to maintain separate streams for separate message types, wherein the cryptographic key and values of the counter are used to encrypt data of packets of a first message type and a second cryptographic key and values of a second counter are used to encrypt data of packets of a second message type.

Example 7 may include the subject matter of example 6, wherein the computing device is to track the number of packets of the first message type and the second message type that have been sent to the second computing device and to send the number to the second computing device with a packet of a third message type.

Example 8 may include the subject matter of example 7, wherein the first message type is Posted Request, the second message type is Completion, and the third message type is Non-Posted Request.

Example 9 may include the subject matter of any of examples 1-8, wherein the encryption engine is to synchronize the counter with a second counter kept by the second computing device responsive to a link retraining event.

Example 10 may include the subject matter of example 9, wherein the computing device is to add delay to a link retraining event to ensure that no more than one link retraining event occurs over a window of time in order to accurately synchronize the counter.

Example 11 may include the subject matter of any of examples 1-10, wherein the packet engine is to calculate an integrity check value based at least in part on data of the first packet and include the integrity check value in the first packet.

Example 12 may include the subject matter of example 11, wherein at least a portion of the integrity check value is placed in a field of the first packet that is specified as a cyclic redundancy check by the communication protocol.

Example 13 may include the subject matter of example 11, wherein the integrity check value is calculated at a data link layer level.

Example 14 may include the subject matter of example 11, wherein the integrity check value is calculated at a transaction layer level.

Example 15 may include the subject matter of any of examples 1-14, wherein the packet engine is to calculate an integrity check value for the plurality of packets and include the integrity checksum in the first packet.

Example 16 may include the subject matter of any of examples 1-15, wherein the encryption engine is located within an interface between a data link layer and a physical layer implemented by the computing device.

Example 17 may include the subject matter of any of examples 1-16, further comprising the second computing device.

Example 18 is a method comprising setting up a protected link between a first computing device and a second computing device, wherein communication over the protected link is to comply with a communication protocol that allows packets to be reordered during transit; generating a plurality of packets according to a packet format that ensures the plurality of packets will not be reordered during transmission over the protected link, the plurality of packets comprising a first packet and a second packet; and encrypting data of the plurality of packets for transmission over the protected link, wherein data of the first packet is encrypted based on the cryptographic key and a first value of a counter and data of the second packet is encrypted based on the cryptographic key and a second value of the counter.

Example 19 may include the subject matter of example 18, wherein the communication protocol is a Peripheral Component Interconnect Express (PCI Express) protocol.

Example 20 may include the subject matter of any of examples 1-19, wherein data of the plurality of packets are encrypted according to Advanced Encryption Standard (AES) implemented in the Galois Counter Mode (GCM).

Example 21 may include the subject matter of any of examples 18-20, wherein the packet that is reorderable according to the communication protocol is to be encapsulated within another packet that is not reorderable by the communication protocol.

Example 22 may include the subject matter of example 21, wherein the packet that is reorderable according to the communication protocol is encapsulated within a PCI Express Posted Request message.

Example 23 may include the subject matter of any of examples 18-22, wherein separate streams are maintained for separate message types, wherein the cryptographic key and values of the counter are used to encrypt data of packets of a first message type and a second cryptographic key and values of a second counter are used to encrypt data of packets of a second message type.

Example 24 may include the subject matter of example 23, wherein the number of packets of the first message type and the second message type that have been sent to the second computing device are tracked and sent to the second computing device with a packet of a third message type.

Example 25 may include the subject matter of example 24, wherein the first message type is Posted Request, the second message type is Completion, and the third message type is Non-Posted Request.

Example 26 may include the subject matter of any of examples 18-25, further comprising synchronizing the counter with a second counter kept by the second computing device responsive to a link retraining event.

Example 27 may include the subject matter of example 26, further comprising adding delay to a link retraining event to ensure that no more than one link retraining event occurs over a window of time in order to accurately synchronize the counter.

Example 28 may include the subject matter of any of examples 18-27, further comprising calculating an integrity check value based at least in part on the first packet and include the integrity check value in the first packet.

Example 29 may include the subject matter of example 28, wherein at least a portion of the integrity check value is placed in a field of the first packet that is specified as a cyclic redundancy check by the communication protocol.

Example 30 may include the subject matter of example 28, wherein the integrity check value is calculated at a data link layer level.

Example 31 may include the subject matter of example 28, wherein the integrity check value is calculated at a transaction layer level.

Example 32 may include the subject matter of any of examples 18-31, wherein the packet engine is to calculate an integrity check value for the plurality of packets and include the integrity check value in the first packet.

Example 33 may include the subject matter of any of examples 18-32, wherein the encryption engine is located within an interface between a data link layer and a physical layer implemented by the computing device.

Example 34 may include the subject matter of any of examples 18-33, further comprising communicating by the second computing device.

Example 35 is at least one non-transitory machine accessible storage medium having instructions stored thereon, the instructions when executed on a machine, cause the machine to set up a protected link between a first computing device and a second computing device, wherein communication over the protected link is to comply with a communication protocol that allows packets to be reordered during transit; generate a plurality of packets according to a packet format that ensures the plurality of packets will not be reordered during transmission over the protected link, the plurality of packets comprising a first packet and a second packet; and encrypt data of the plurality of packets for transmission over the protected link, wherein data of the first packet is encrypted based on the cryptographic key and a first value of a counter and data of the second packet is encrypted based on the cryptographic key and a second value of the counter.

Example 36 may include the subject matter of example 35, wherein the communication protocol is a Peripheral Component Interconnect Express (PCI Express) protocol.

Example 37 may include the subject matter of any of examples 35-36, wherein data of the plurality of packets are encrypted according to Advanced Encryption Standard (AES) implemented in the Galois Counter Mode (GCM).

Example 38 may include the subject matter of any of examples 35-37, wherein the instructions when executed, further cause the machine encapsulate a packet that is reorderable according to the communication protocol within another packet that is not reorderable by the communication protocol.

Example 39 may include the subject matter of example 38, wherein the packet that is reorderable according to the communication protocol is encapsulated within a PCI Express Posted Request message.

Example 40 may include the subject matter of any of examples 35-39, wherein the instructions when executed, further cause the machine to maintain separate streams for separate message types, wherein the cryptographic key and values of the counter are used to encrypt data of packets of a first message type and a second cryptographic key and values of a second counter are used to encrypt data of packets of a second message type.

Example 41 may include the subject matter of example 40, wherein the instructions when executed, further cause the machine to track the number of packets of the first message type and the second message type that have been sent to the second computing device and to send the number to the second computing device with a packet of a third message type.

Example 42 may include the subject matter of example 41, wherein the first message type is Posted Request, the second message type is Completion, and the third message type is Non-Posted Request.

Example 43 may include the subject matter of any of examples 35-42, wherein the instructions when executed, further cause the machine to synchronize the counter with a second counter kept by the second computing device responsive to a link retraining event.

Example 44 may include the subject matter of example 43, wherein the instructions when executed, further cause the machine to add delay to a link retraining event to ensure that no more than one link retraining event occurs over a window of time in order to accurately synchronize the counter.

Example 45 may include the subject matter of any of examples 35-44, wherein the instructions when executed, further cause the machine to calculate an integrity check value based at least in part on data of the first packet and include the integrity check value in the first packet.

Example 46 may include the subject matter of example 45, wherein at least a portion of the integrity check value is placed in a field of the first packet that is specified as a cyclic redundancy check by the communication protocol.

Example 47 may include the subject matter of example 45, wherein the integrity check value is calculated at a data link layer level.

Example 48 may include the subject matter of example 45, wherein the integrity check value is calculated at transaction layer level.

Example 49 may include the subject matter of any of examples 35-48, wherein the instructions when executed, further cause the machine to calculate an integrity check value for the plurality of packets and include the integrity check value in the first packet.

Example 50 may include the subject matter of any of examples 35-49, wherein an encryption engine is located within an interface between a data link layer and a physical layer implemented by the computing device.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A computing device comprising:
    a memory to store a cryptographic key;
    a security engine comprising circuitry, the security engine to setup a protected link between the computing device and a second computing device, wherein communication over the link is to comply with a communication protocol that allows packets to be reordered during transit;

a packet engine comprising circuitry, the packet engine to generate a plurality of packets according to a packet format that ensures the plurality of packets will not be reordered during transmission over the protected link, the plurality of packets comprising a first packet and a second packet; and an encryption engine comprising circuitry, the encryption engine to encrypt data of the plurality of packets for transmission over the protected link, wherein the encryption engine is to encrypt data of the first packet based on the cryptographic key and a first value of a counter and to encrypt data of the second packet based on the cryptographic key and a second value of the counter.

2. The computing device of claim 1, wherein the communication protocol is a Peripheral Component Interconnect Express (PCI Express) protocol.

3. The computing device of claim 1, wherein the encryption engine is to encrypt data of the plurality of packets according to Advanced Encryption Standard (AES) implemented in the Galois Counter Mode (GCM).

4. The computing device of claim 1, wherein the packet engine is to encapsulate a packet that is reorderable according to the communication protocol within another packet that is not reorderable by the communication protocol.

5. The computing device of claim 4, wherein the packet that is reorderable according to the communication protocol is encapsulated within a PCI Express Posted Request message.

6. The computing device of claim 1, wherein the encryption engine is to maintain separate streams for separate message types, wherein the cryptographic key and values of the counter are used to encrypt data of packets of a first message type and a second cryptographic key and values of a second counter are used to encrypt data of packets of a second message type.

7. The computing device of claim 6, wherein the computing device is to track a number of packets of the first message type and the second message type that have been sent to the second computing device and to send the number to the second computing device with a packet of a third message type.

8. The computing device of claim 7, wherein the first message type is Posted Request, the second message type is Completion, and the third message type is Non-Posted Request.

9. The computing device of claim 1, wherein the encryption engine is to synchronize the counter with a second counter kept by the second computing device responsive to a link retraining event.

10. The computing device of claim 9, wherein the computing device is to add delay to a link retraining event to ensure that no more than one link retraining event occurs over a window of time in order to accurately synchronize the counter.

11. The computing device of claim 1, wherein the packet engine is to calculate an integrity check value based at least in part on data of the first packet and include the integrity check value in the first packet.

12. The computing device of claim 11, wherein at least a portion of the integrity check value is placed in a field of the first packet that is specified as a cyclic redundancy check by the communication protocol.

13. The computing device of claim 11, wherein the integrity check value is calculated at a data link layer level.

14. The computing device of claim 11, wherein the integrity check value is calculated at a transaction layer level.

15. The computing device of claim 1, wherein the packet engine is to calculate an integrity check value for the plurality of packets and include the integrity check value in the first packet.

16. The computing device of claim 1, wherein the encryption engine is located within an interface between a data link layer and a physical layer implemented by the computing device.

17. The computing device of claim 1, further comprising the second computing device.

18. A method comprising:
setting up a protected link between a first computing device and a second computing device, wherein communication over the protected link is to comply with a communication protocol that allows packets to be reordered during transit;
generating a plurality of packets according to a packet format that ensures the plurality of packets will not be reordered during transmission over the protected link, the plurality of packets comprising a first packet and a second packet; and
encrypting data of the plurality of packets for transmission over the protected link, wherein data of the first packet is encrypted based on a cryptographic key and a first value of a counter and data of the second packet is encrypted based on the cryptographic key and a second value of the counter.

19. At least one non-transitory machine accessible storage medium having instructions stored thereon, the instructions when executed on a machine, cause the machine to:
set up a protected link between a first computing device and a second computing device, wherein communication over the protected link is to comply with a communication protocol that allows packets to be reordered during transit;
generate a plurality of packets according to a packet format that ensures the plurality of packets will not be reordered during transmission over the protected link, the plurality of packets comprising a first packet and a second packet; and
encrypt data of the plurality of packets for transmission over the protected link, wherein data of the first packet is encrypted based on a cryptographic key and a first value of a counter and data of the second packet is encrypted based on the cryptographic key and a second value of the counter.

20. The storage medium of claim 19, wherein the instructions when executed, further cause the machine to:
encapsulate a packet that is reorderable according to the communication protocol within another packet that is not reorderable by the communication protocol.

21. The computing device of claim 1, wherein the first value of the counter is a first initialization vector and the second value of the counter is a second initialization vector.

* * * * *